Figure 1:
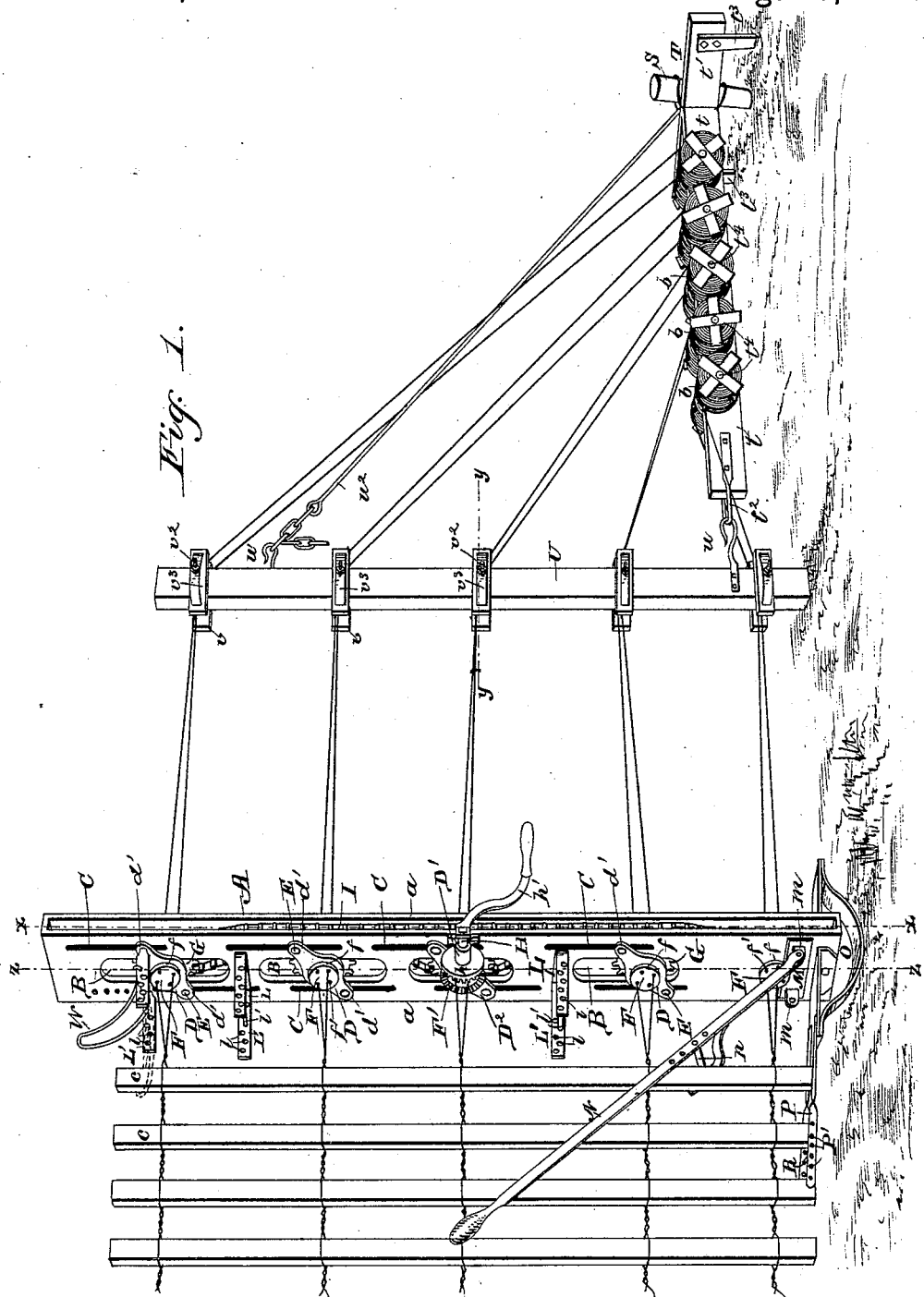

(No Model.) 2 Sheets—Sheet 1.

G. & L. KESLING.
MACHINE FOR MAKING PICKET FENCES.

No. 346,923. Patented Aug. 10, 1886.

Witnesses
Percy C. Bovin
J. C. Garner

Inventor,
Granville Kesling,
Luther Kesling:
By their Attorneys
C. A. Snow & Co.

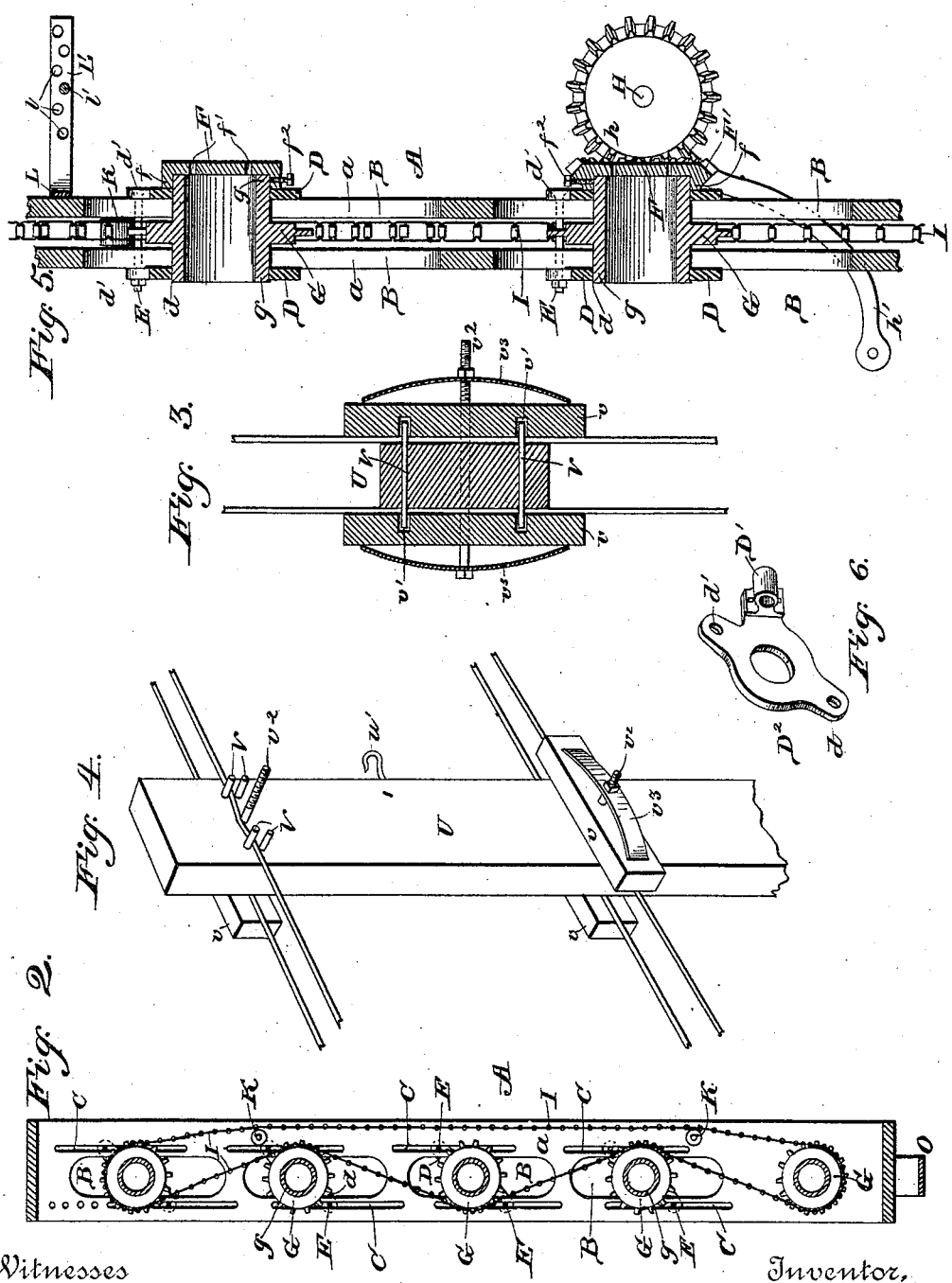

United States Patent Office.

GRANVILLE KESLING AND LUTHER KESLING, OF ONWARD, INDIANA.

MACHINE FOR MAKING PICKET FENCES.

SPECIFICATION forming part of Letters Patent No. 346,923, dated August 10, 1886.

Application filed March 26, 1886. Serial No. 196,700. (No model.)

*To all whom it may concern:*

Be it known that we, GRANVILLE KESLING and LUTHER KESLING, citizens of the United States, residing at Onward, in the county of Cass and State of Indiana, have invented a new and useful Improvement in Machines for Making Picket Fences, of which the following is a specification, reference being had to the accompanying drawings.

Our invention relates to an improvement in machines for making slat and wire fences; and it consists in the peculiar construction and combination of parts that will be more fully set forth hereinafter, and particularly pointed out in the claims.

In the drawings, Figure 1 is a perspective view of our invention. Fig. 2 is a vertical section taken on the line $x\,x$ of Fig. 1. Fig. 3 is a horizontal transverse section taken on the line $y\,y$ of Fig. 1. Fig. 4 is a detail perspective view of the upper end of the tension-bar with the bearing-blocks removed. Fig. 5 is a detail transverse sectional view of the fencing device, taken on the line $z\,z$ of Fig. 1. Fig. 6 is a detail perspective view of the reversible plate $D^2$, having the bearing $D'$.

A represents a vertical frame, which is provided with the closed sides $a$, and the said frame or box is of any suitable length. In the sides $a$ are made a series of aligned vertical elongated slots, B, and on each side of each of the said slots is a similar slot, C, which are of much less width than the slots B. The slots C on one side of the slots B are higher than those on the opposite side thereof, the slots B and C being thus arranged obliquely in the frame, as shown in Figs. 1 and 2.

D represents bearing-plates, having the enlarged central portions provided with the circular openings $d$ and the extended arms $d'$. Clamping-bolts E pass through openings which are made in the outer ends of these arms and extend through the slots C, so as to secure the plates on the front side of the frame or box, and with the central openings of the said plates registering with the slots B. By loosening the clamping-nuts on the threaded ends of the bolts E, the plates D may be adjusted vertically on the box or frame A.

F represents circular disks having annular flanges $f$, which extend from their rear sides. These disks are provided with openings $f'$, arranged at a suitable distance apart.

G represents sprocket-wheels, which are provided with central projecting hubs, $g$, on each side, which enter the annular flanges $f$ of the disks and extend through the openings $d$ of the plates D, and are thereby journaled in the frame A. Set-screws $f^2$, which extend through the flanges $f$, bear on the hubs, and thus cause the wheels G and the disks F to rotate together. By providing the sprocket-wheels with extended hubs on one end of which are secured the disks F, and the other ends of which are journaled in the plates D, the disks are caused to rotate with the sprocket-wheels when the latter are turned, and both the disks and sprocket-wheels are adjusted vertically by the vertical adjustment of the plates D. Thus both the sprocket-wheels and the twisters or hubs will be carried by the plates D in the adjustment of the latter. The connection of the disks to the hubs of the sprocket-wheels by means of set-screws enables the disks to be detachably fitted in place, so as to permit their removal at will. If the disks were not removable, the plates D could not be inserted over the hubs of the sprocket-wheels. Through each of the wheels G is made a central opening, as shown. One of the disks F is provided on its outer side with miter gear-teeth F', and the plate $D^2$ of the said disk is provided with a projecting bearing, D', in which is journaled a shaft, H. This shaft has secured to its inner end a miter-gear wheel, $h$, which meshes with the disk F', and at the outer end of the said shaft is attached a crank-handle, $h'$. By this construction it will be readily understood that the plate may be removed from the frame and applied and secured thereto in the reverse position from that shown in Fig. 1, so as to cause the crank-handle to project from either side of the frame A, and thus adapt the machine to be operated from either side of the fence. An endless sprocket-chain, I, passes over the series of sprocket-wheels G, and connects them together in such a manner as to cause alternate sprocket-wheels to rotate in opposite directions when the crank is turned, as shown in Fig. 2. Anti-friction rollers K bear against the outer side of the endless sprocket-chain, and are journaled in between the sides of the box or frame A. On the front side of the box or frame A are secured brackets L, having forwardly-extending horizontal parallel arms L', provided with the series of aligned openings l, through which pass transverse horizontal pins l'. By means of this series of openings the pins may be adjusted in or out in the arms L'.

On the front side of the box or frame A, near the lower end thereof, is secured a transverse plate, M, which is provided at opposite ends with right-angled extending ears m, to either of which may be pivoted the lower bifurcated end of a hand-lever, N, which lever is provided on one side with an extended stirrup or bearing, n. To the lower end of the box or frame A is secured a supporting shoe or runner, O, and on the front end of this runner are secured a pair of horizontal parallel springs, P, having their outer ends twisted vertically and provided with the series of openings P', in which is secured a transverse pin, R. These horizontal springs and the transverse pin form a loop to receive the lower ends of the pickets successively as they are secured between the wires. This arm or loop P is made adjustable by means of a pin, R, fitting in any one of the openings P'.

S represents a stake or anchor, to be driven in or secured to the ground, in a line with the fence to be constructed, and to this said post or anchor is secured a spool-rack, T, which is composed of the arm t and the head-beam t', arranged at right angles to the said arm, and to the center of which one end of the said arm is attached. The free end of the arm t is provided with a clevis, t², and the transverse beam t' is provided at its ends with supporting-legs t³. To the arm t are secured a series of transverse bearing-spindles, t⁴, on which are journaled the spools or reels of wire b.

U represents a vertical tension-bar, the lower rear side of which is provided with a hook, u, that engages the clevis t², and the rear upper end of which is provided with a similar hook, u', that engages a brace-rod, u², which has its opposite end attached to the beam t'. The spool-rack is secured to the post or anchor, as shown in Fig. 1. From opposite sides of the tension-bar project series of pins V, which are arranged as shown in Fig. 3, the said series corresponding in number to the disks F. Tension-blocks v are provided with openings v', to receive the projecting ends of the pins V, and the said blocks are placed on opposite sides of the tension-bar and are connected together in pairs and to the said bar by means of transverse bolts v². Semi-elliptic springs v³ are placed on the ends of these bolts and bear against the tension-blocks, and by turning the nuts on the threaded ends of the bolts v² the pressure of the blocks against the sides of the tension-bar may be regulated at will, as will be very readily understood.

The operation of our invention is as follows: The wires from the spools are passed through the series of pins v and between the tension-bar and the tension-blocks, and from thence are passed in pairs through the openings in the sprocket-wheels G, and through opposite openings, f, in the disks F. The outer ends of the said wires are attached securely to the corner fence-post. To the bracket L, at the upper end of the box or frame A, is pivoted a loop, W. A slat, c, is placed between the arms of the brackets L, and between the pairs of wires, and the crank h' is then turned once or twice, which causes the disks to rotate, and thus twist the wires and thus secure the slat thereto. The box or frame A is then moved forwardly from the slat for a slight distance, the loop W is caused to engage with the upper end of the slat, and the pin R, secured between the spring-arms P, bears against the lower end of the preceding slat on one edge thereof, and thus maintains the box or frame A in a vertical position, parallel with the slats and at a suitable distance therefrom. This distance may be regulated or adjusted by attaching the loop W in either of the series of openings l in the bracket, and by moving the pin R in or out in the outer end of the spring-arms P by means of the series of openings in said arms, this loop W is adapted to swing upward out of engagement with the slats or pickets of the fence when adjusting the slats. A third slat is then inserted between the wires and the parallel arms of the bracket and bears against the pins l', secured therein, and the stirrup or bearing n of the hand-lever N bears against the slat that has already been inserted between the wires. The crank is then turned, as in the previous instance, causing the disk F to rotate and twist the wires so as to secure the second slat thereto. The loop W and the spring-arms P are then disengaged from the upper and lower ends of the slats, and the hand-lever N is depressed, which lever, by bearing against one of the slats, causes the shoe or runner to move on the ground for a suitable distance and carry the box or frame A to a suitable position for inserting another slat, and so on until the fence is completed. The wires are secured to ordinary fence-posts driven in the ground at suitable distances apart, from time to time, in order to secure the fence.

A machine thus constructed is cheap and simple, is very durable, and enables the fence to be built with great rapidity, and can be operated from either side of the fence with equal ease.

The anchored spool-rack is located in a horizontal plane, while the tension-bar U extends in a vertical line, this arrangement contributing to the more efficient action of the tension-bar and enabling the tension on the wires to be maintained at all times.

Having thus described our invention, we claim—

1. In a machine for making fences, the vertical frame A, carrying the mechanism for twisting the wires, and provided with a shoe or runner, O, at its bottom, which serves as the sole support for the frame, and a hand-lever, N, pivoted to the frame near the bottom, and provided with a projection or bearing, n, to bear against one of the slats of the completed fence to cause the proper movement of said frame, as set forth.

2. In a machine for making fences, the frame A, having the slots B C, in combination with the plates D, the sprocket-wheels G, journaled in the plates, the rotating disks F, connected to the sprocket-wheels, and bolts connected to the plates D and passed through the slots C, for adjusting the parts, as set forth.

3. The frame A, in combination with the plates D, the sprocket-wheels G, journaled in the plates, the disk F, connected to the sprocket-wheels, and means for adjusting the plates vertically, and thereby effecting the vertical adjustment of the disks and sprocket-wheels, as set forth.

4. The combination of the box or frame A, the sprocket-wheels journaled therein and having the extended hubs, and the disks F, having the annular flanges and means for detachably securing them on the said hubs, substantially as described.

5. The box or frame A, having the twisting mechanism, and having the parallel arms L', extending from one side of the box or frame, and the transverse pins l', secured to the said arms and adjustable therein, substantially as described.

6. The combination of the box or frame A, carrying the twisting mechanism, with the loop W at the upper end of the box or frame, for engaging with the upper end of one of the slats, and the spring-arms P at the lower end of said frame having the transverse pin R, for engaging with the lower end of one of the slats, substantially as described.

7. In a machine for making fences, the combination of the anchored spool-rack with the tension-bar connected to the rack and provided with tension devices, through which are passed the wires from the spool-rack, as set forth.

8. The combination of the anchored spool-rack, the tension-bar having its lower end attached to one end of the spool-rack, and the brace-rod U², connecting the upper end of the tension-bar with the spool-rack, substantially as described.

9. The combination, with the frame carrying the rotating disks, one of said disks having the gear-wheel F', of the removable and reversible plate D², provided with the bearing D', the crank-shaft journaled in the said bearing and carrying the gear-wheel h to mesh with wheel F', and means for securing the said plate to the frame, whereby the crank may be caused to project from either side thereof, and thus adapt the machine to be operated from either side of the fence, substantially as described.

10. The combination of the frame A, with the arm P, connected to the lower end of the frame, and provided with adjustable pins R, and the adjustable and swinging loop W, attached to the upper end of the said frame, as set forth.

11. The box or frame A, having the vertically-adjustable plates D, and the rotating disks or twisters F, carried by the plates in their adjustments, as set forth.

12. The box or frame A, having the slots B, in combination with the sprocket-wheels G, having the extended hubs projected into the slots, the plates D, in which one series of the hubs are journaled, the rotating disk F, fitted to the other series of hubs, and the reversible plate D², fitted on one of the hubs, as set forth.

13. The combination, with the frame A, having the slots B, of the sprocket-wheels G, having extended hubs projected into the slots, the disks F, secured to the hubs and rotating therewith, the gear-wheels F F, the removable and reversible plates D², carrying the crank-shaft, and the gear-wheel h, to mesh with gear F', as set forth.

14. In combination with frame A, the spring-arms P, connected to the same and provided with adjustable means to engage the slats or pickets, as set forth.

15. In a fence-making machine, the combination, with the horizontal spool-rack anchored to the ground and carrying the spools or reels, all located in the same horizontal plane, of the tension-bar U, arranged in a vertical plane, and a series of tension-blocks fitted to the tension-bar, and through which blocks the wires from the spools or reels pass, as set forth.

16. In a fence-making machine, the combination of the tension-bar with the anchored spool-rack, comprising the arm t and head-beam t', located at right angles to the same, and spindles t⁴, for the spools or reels of wire secured to the arm t, as set forth.

In testimony that we claim the foregoing as our own we have hereto affixed our signatures in presence of two witnesses.

GRANVILLE KESLING.
    LUTHER KESLING.

Witnesses:
 GEO. B. FORGY,
 JOHN WALKER,